April 10, 1951 J. W. STAFFORD 2,548,566

ISOLATED PHASE BUS STRUCTURE

Filed Sept. 14, 1949 4 Sheets-Sheet 1

INVENTOR

James Walter Stafford by Edward N. Fetherstonhaugh

ATTORNEY

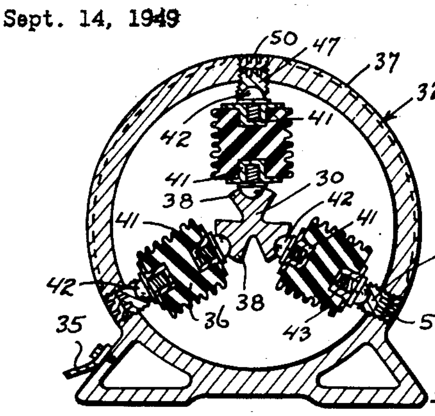
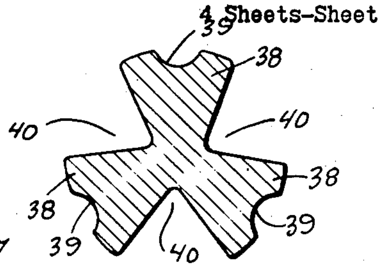
FIG - 5
FIG - 4
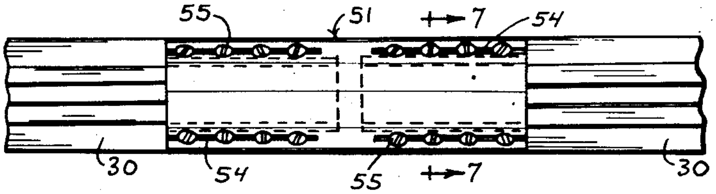
FIG - 6
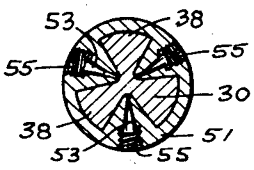
FIG - 7
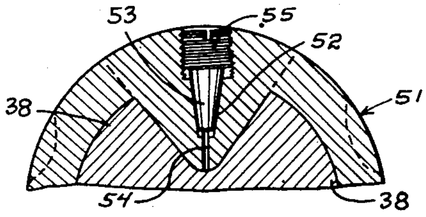
FIG - 8
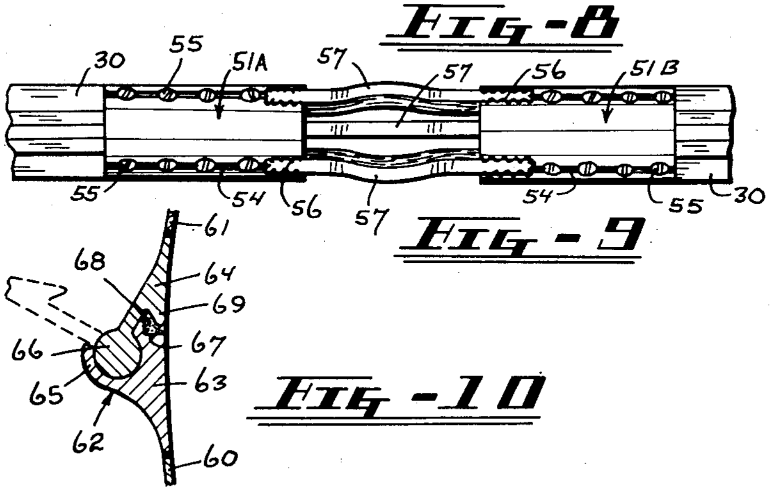
FIG - 9, FIG - 10
INVENTOR
James Walter Stafford
by Edward N. Fetherstonhaugh
ATTORNEY April 10, 1951 J. W. STAFFORD 2,548,566

ISOLATED PHASE BUS STRUCTURE

Filed Sept. 14, 1949 4 Sheets-Sheet 3

INVENTOR
James Walter Stafford
by Edward N. Fetherstonhaugh
ATTORNEY

INVENTOR
James Walter Stafford
by Edward N. Fetherstonhaugh
ATTORNEY

Patented Apr. 10, 1951 2,548,566

UNITED STATES PATENT OFFICE 2,548,566

ISOLATED PHASE BUS STRUCTURE

James Walter Stafford, Montreal, Quebec, Canada

Application September 14, 1949, Serial No. 115,593

5 Claims. (Cl. 174—95)

The invention relates to improvements in isolated phase bus structures as described in the present specification and illustrated in the accompanying drawings that form a part of the same.

The invention consists essentially of the novel features of construction as pointed out broadly and specifically in the claims for novelty following a description containing an explanation in detail of acceptable forms of the invention.

The objects of the invention are to devise isolated phase bus structures which may be made preferably of non-magnetic materials and in which the same will have desirable electrical properties which will be advantageous to installation of the isolated phase type; to contrive an isolated phase bus structure in which phase-to-phase short circuits will generally be eliminated; to make isolated phase bus structures which may be easily planned and fabricated and in which the same will facilitate the testing thereof as a complete unit; to furnish isolated phase bus structures which will be inexpensive, provide easy accessibility of the interior parts, and in which the cost of assembly will be minimized; to plan isolated phase bus structures in which the various parts will be standard and interchangeable thereby facilitating replacement thereof; and generally to provide isolated phase bus structures which will be rust proof, weather proof, durable, and efficient for their use.

In the drawings:

Figure 4 is an enlarged cross sectional view through one of the support rings of the structure and showing a bus bar supported therein.

Fig. 5 is an enlarged sectional cross sectional view taken through one of the bus bars.

Figure 6 is a fragmentary plan view in which a pair of bus bars in alignment with one another are connected by a straight coupler.

Figure 7 is a cross sectional view as taken on the line 7—7 in Figure 6.

Figure 8 is an enlarged fragmentary detail of a portion of the cross sectional view shown in Figure 7.

Figure 9 is a fragmentary plan view in which a pair of bus bars in alignment with one another are connected by flexible couplings.

Figure 10 is an enlarged fragmentary cross sectional view showing one of the hinges as connected to two halves of an enclosure for the phase bus structure.

Like numerals of reference indicate corresponding parts in the various figures.

In the specific construction of the invention as hereinafter defined the parts of the isolated phase bus structures will be generally made of aluminum due to its many advantages in this field of endeavour, however it will be seen that other types of metal could be used in most cases with perhaps only slight alterations in construction and layout of the installation.

Figure 1:
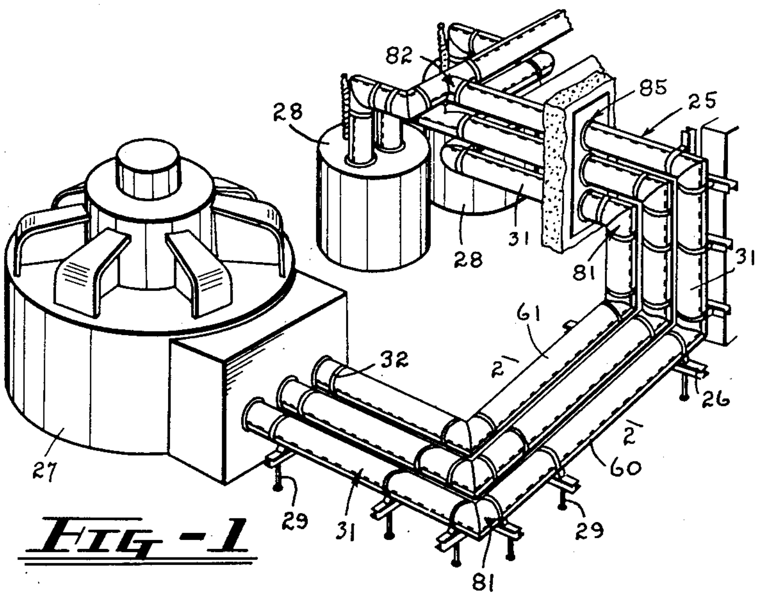
Figure 1 is a fragmentary perspective view showing a general assembly of an isolated phase bus structure in which the same is shown connecting a generator with a plurality of transformers.
Figure 2:
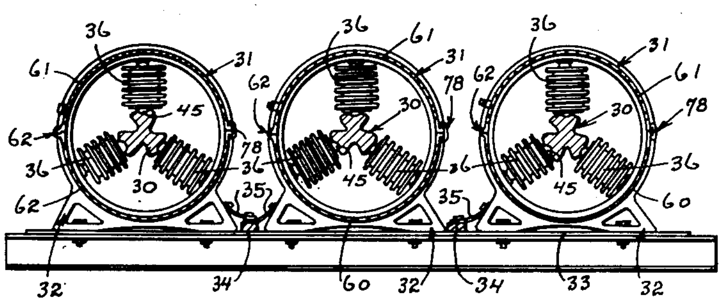
Figure 2 is a sectional view through the isolated phase bus structure as taken on the line 2—2 in Figure 1.
Figure 3:
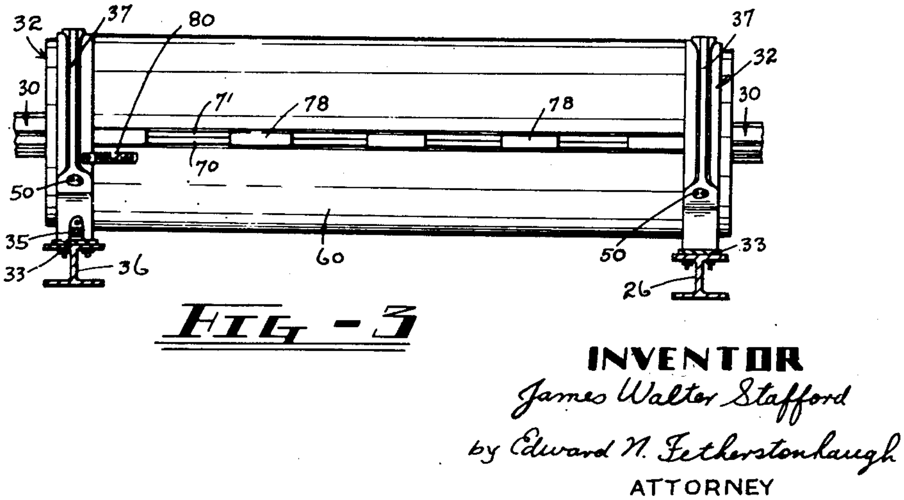
Figure 3 is a fragmentary side view of the structure in which a phase bus extends through a section of the enclosure therefor.
Figure 11:
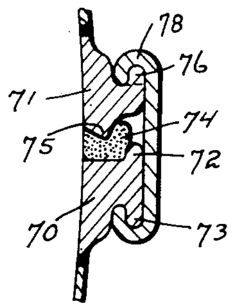
Figure 11 is an enlarged fragmentary cross sectional view through one of the locking means as connected to the two halves of an enclosure for the phase bus structure.
Figure 12:
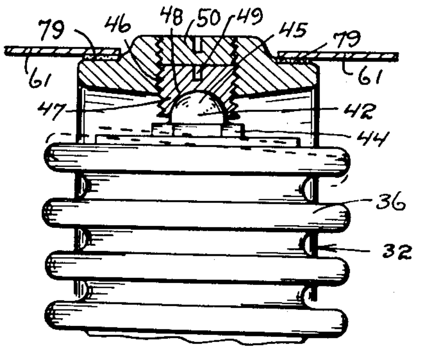
Figure 12 is an enlarged sectional view through one of the support rings for the structure and showing a cup type socket screwed into the ring and in engagement with the outer end of an insulator.

Referring to the drawings, the isolated phase bus structure as indicated by the numeral 25 is suitably supported by H-beams 26 which are located underneath the lower horizontal isolated phase bus members and at one side of the upper horizontal isolated phase bus members and the vertical isolated phase bus members as illustrated in Figure 1. The isolated phase bus structure connects a generator 27 with a plurality of transformers 28. The H-beams 26 which support the upper horizontal and vertical isolated phase bus members may be secured to columns, walls, or partitions of a building, while the H-beams supporting the lower horizontal isolated phase bus members may be suitably mounted on support posts 29 which, in turn, rest on the foundation or floor of a building.

The isolated phase bus structure 25 consists of a plurality of bus bars 30 which are accommodated in enclosures 31 and the latter, in turn, are mounted in support rings 32. Lateral ground bus bars 33 are positioned on the H-beams 26 and extend continuously along almost the entire length thereof. The support rings 32 are positioned on these lateral ground bus bars and substantially secured through the same to the H-beams 26 thereby substantially grounding the support rings 32. Longitudinal ground bus bars 34 are supported by the lateral ground bus bars 33 on the H-beams 26 and each of the former is connected to the support rings 32 by means of a flexible grounding cable 35. The bus bars 30 are centrally positioned within the support rings 32 and supported by means of the insulators 36.

Each of the support rings 32 is of circular formation and has a base portion extending outward therefrom and being integral therewith. These support rings have a rib 37 extending partially around the circular portion and this rib is centrally located on the outer surface thereof.

Each of the bus bars 30 is of a somewhat "clover-leaf" cross section, in that the bus bar has a plurality of projections 38 extending outward from the center and continuing along the entire length thereof. Each of these projections 38 increases in width as it extends outward from the center and the outer surface has an arcuately shaped groove continuing along the entire length thereof. The extreme outer surfaces of each of the projections 38 are of an arcuate shape, the center of which is the center of the bus bar. All the projections 38 of a particular bus bar extend outward from the center the same distance, and since the outer edges are arcuately shaped, if continued around would form a complete circle. V-shaped grooves 40 are formed between the projections 38 and the surfaces thus formed provide additional area which would be equal to a tubular bus bar having a much greater overall diameter. The particular shape of the bus bars disclosed herein provides high current carrying capacity due to the extremely large surface area as against the small overall diameter. A further advantage with this particular shape of bus bar is a reduced skin effect due to a large proportion of the bus bar or conductor being on the outer perimeter.

Each of the insulators 36 has a suitable metal insert 41 located in each end thereof and these inserts are internally threaded to accommodate ball nose screws 42. Each of the ball nose screws 42 consists of a threaded shank 43 which engages with the insert 41, and a shoulder 44 extends outward from the shank. A half spherical ball nose 45 is formed on the outer side of the shoulders 44 and coincides with the arcuately shaped grooves 39 in the bus bars 30 thereby permitting engagement therewith and providing a means of substantially supporting the bus bar. In this instance, it will be seen that three ball nose screws 42 will rigidly support the bus bar laterally and at the same time permit longitudinal movement thereof due to expansion or construction of the bar under varying conditions.

The ball nose screws 42 are also used on the outer ends of the insulators for suitably securing the same within the support rings 32. In this respect internally threaded holes 46 extend through the support rings 32 and are equally spaced apart. A cup type socket 47, which is externally threaded engages in each of the internally threaded holes 46 and extends inward from the support ring 32. Each of these cup type sockets 47 has an arcuate cup formation 48 on the inner end thereof which coincides with the shape of the ball nose 45 on the ball nose screws 42 thereby permitting engagement with one another for substantially supporting the outer end of each of the insulators. Each of the cup type sockets 47 has a pair of shallow holes 49 in the outer end permitting engagement of an adjusting tool therewith. A lock nut 50 is threaded into each of the internally threaded holes 46 in the support rings 32 thereby substantially locking the cup type sockets 47 in position and completing the rigid assembly of the bus bars 30 with respect to the support rings 32.

Straight couplers 51 provide a means of connecting lengths of bus bars 30 in alignment with one another. In preparing the ends of these lengths of bus bars 30 to be connected by the straight couplers 51, a portion of the end of each of the bars is turned down so that it may be fitted into the straight coupler and the outside diameter of these couplers is the same as the partial diameter formed by the arcuately shaped outer edges of the projections 38 of the bus bars. The couplers 51 are of a cylindrical formation being round on the outside surface thereof and having the inner wall of a shape and form coinciding with that of the bus bars 30 at the ends where the projections thereof have been turned down. Each end of these straight couplers has three rows of tapered holes 52 equally spaced apart, and extending thereinto. The outermost portion of each of these tapered holes is enlarged and internally threaded. Slits 54 are then cut in each end of the straight couplers in alignment with the tapered holes therein. Tapered plugs 53 are provided with an externally threaded portion 55 on the outer end thereof, and the same are adapted to be inserted in the tapered holes 52 and the threaded portion thereof engages with the enlarged internally threaded portion of the tapered holes 52.

It may be pointed out at this time that in joining any of the bus bars together, a lubricating grease is applied thereto so as to increase the efficiency of the joints. This lubricating grease may be composed of a petrolatum base, inhibitors and zinc dust incorporated therein.

In joining a pair of bus bars in line with one another the ends of the same are inserted in the ends of the straight couplers 51. The tapered plugs 53 are then tightened down in the tapered holes 52 and the slits 54 in the straight couplers permit the portions at each side thereof to be forced outward by the tapered plug so that they wedge tightly against the side of the projections 38 of the bus bars, thereby making a tight joint.

In making a flexible connection between a pair of bus bars, a straight coupler 51 is cut in two to provide a pair of couplers 51A and 51B, and enlarged slots 56 are made in the slits 54 at the ends thereof. Laminated strips 57 are then inserted in the enlarged slots 56 in the couplers 51A and 51B. The ends of these laminated strips extending into the slots are then substantially welded to the couplers 51A and 51B, thereby forming a flexible coupler. These couplers 51A and 51B are then secured over the ends of the bus bars in a similar manner to that of the foregoing.

It will be noted in the present invention that the bus bars 30 are shown as consisting of three projections or ribs and also that each set of laminated strips also consists of three units which are equally spaced apart, however, it will be understood that bus bars may have any suitable number of projections or ribs and also that any suitable number of laminated strips could be used in making a flexible joint depending on the requirements of the installation.

Figures 13, 14:
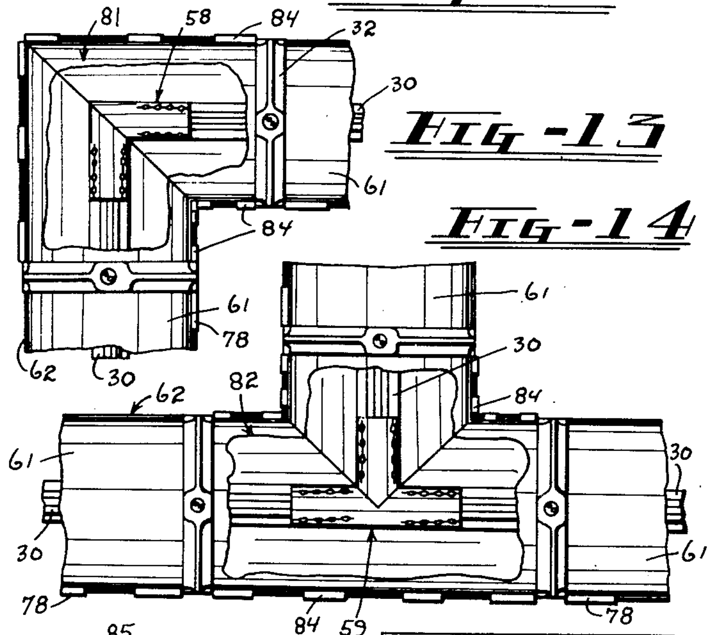
Figure 13 is a fragmentary side view of an angle enclosure and in which the same is partially broken away to show an angle coupler suitably connected to a pair of bus bars.
Figure 14 is a fragmentary side view of a T-enclosure and in which the same is partially broken away to show a T-coupler suitably connected to a pair of bus bars.

The angle coupler 58 shown in Figure 13 and the T-coupler 59 illustrated in Figure 14 is adapted to be secured to the ends of the bus bars in the same way as that of the straight coupler 51. The only difference between the angle coupler and the T-coupler is that they are made from two parts which are suitably cut and welded or otherwise secured together.

The enclosures 31 are adapted to shield the bus bar arrangement and completely cover the same. These enclosures 31 each consist of a stationary section 60 and a movable section 61. This stationary section 60 may be fixedly secured with respect to the support rings 32 in any suitable manner, and the movable section 61 is thereby supported by the stationary section. These sections 60 and 61 are secured together by a continuous hinge 62 which consists of a female hinge portion 63 and a male hinge portion 64. The female hinge portion 63 has an arcuate lip portion 65 which extends partially around a bead portion 66 forming part of the male hinge portion thereby providing a hinge connection between the hinge portions 63 and 64. The inner adjacent portions of the female and male hinge portions 63 and 64 form a recess 67 therebetween when both of the same are in a closed position. The greater part of this recess 67 is formed in the female hinge portion 63 which has a cutout portion therein and in which a gasket 68 is fixedly secured. The male hinge portion 64 has a projection 69 extending inward therefrom, and which engages the gasket 68 when the continuous hinge 62 is in a closed position. These hinge portions 63 and 64 are welded or otherwise secured to the stationary and movable sections 60 and 61, respectively, and when the latter are brought to a closed position the projection 69 on the male hinge portion effectively engages the gasket 68, thereby providing an efficient seal between the stationary and movable sections 60 and 61.

A stationary lock strip 70 and movable lock strip 71 are welded or otherwise secured to the stationary section 60 and the movable section 61 of each of the enclosures 31. The stationary lock strip 70 has lips 72 and 73 formed on each side thereof. The lip 72 forms a rest against which a gasket 74 lies and the latter is fixedly adhered to this stationary lock strip. The movable lock strip 71 has a projection 75 extending downward therefrom which engages with the gasket 74, when the lock strips 70 and 71 are brought together. A plurality of lips 76 extend outward from the outer portion of the movable lock strip 71, and coincide in shape, and are in direct alignment with the lip 73 in the stationary lock strip 70. These lip portions are spaced at intervals or could be considered as cut out of a continuous lip strip. A plurality of clamps 78 are provided with turned in edges which are adapted to fit tightly over the lips 73 and 76. In placing these clamps in position, the lower turned in edge of each is engaged with the lip 71 on the stationary lock strip 70 and the upper turned in edge is slipped over the movable lock strip 71 between the lips 76. These clamps are then simply slid along the lock strips 70 and 71 until the upper turned in edge of each is positioned directly over each of the lips 76 on the movable lock strip 71 thereby substantially securing the stationary sections and movable sections 60 and 61 of each of the enclosures 31 together, and accordingly providing an efficient seal therebetween. In removing these clamps 78 they are simply moved to their original position and removed from the lock strips 70 and 71, thus permitting the movable section 61 to be hinged outward from the stationary section 60. A pair of ring gaskets 79 are fitted over each of the support rings 32 at each side of the central rib thereon, and the stationary and movable sections 60 and 61 are fitted snugly against these ring gaskets thereby providing an efficient seal between the enclosures 31 and these support rings 32. These ring gaskets 79 also provide insulation between the enclosures and the support rings. A flexible grounding cable 80 is fixedly secured to the outer side of the stationary section 60 of each of the enclosures 31 and is grounded on the support rings 32.

The angle enclosures 81 and T-enclosures 82 as illustrated in Figures 13 and 14, respectively, are of a similar construction to the enclosures 31 with the exception that the hinges are eliminated and locking strips are inserted at each side of the stationary and movable sections. The angle and T-enclosures 81 and 82 are each made of two stationary sections which are suitably cut and welded together and two movable sections which are suitably cut to shape and welded or otherwise secured together. The stationary and movable sections making up the angle and T-enclosures 81 and 82 are secured together at each side thereof by clamps 84 which are similar to the clamps 78 as hereinbefore described.

Figure 15:
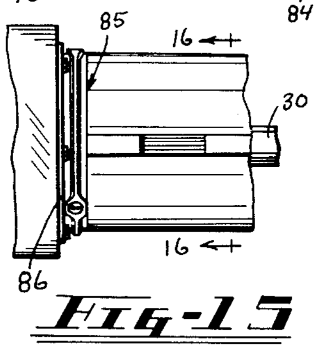
Figure 15 is a fragmentary side view showing a portion of an enclosure suitably connected to a flanged support ring and in which the latter is adapted to suitably support the enclosure where the assembly passes through an obstruction.
Figure 16:
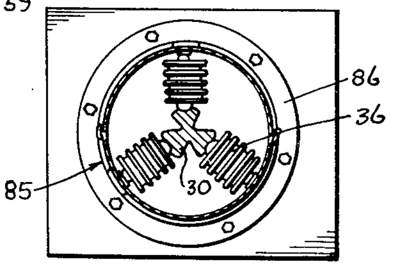
Figure 16 is a cross sectional view as taken on the line 16—16 in Figure 15.

A flange support ring 85 as illustrated in Figures 15 and 16 is adapted to suitably support an enclosure where a portion of the installation passes through an obstruction. This flange ring support 85 is similar to the ring supports 32 with the exception that the base portion is eliminated and the flange 86 is added and provided with a plurality of holes through which the same may be secured to a wall, box, or the like.

Figure 17:
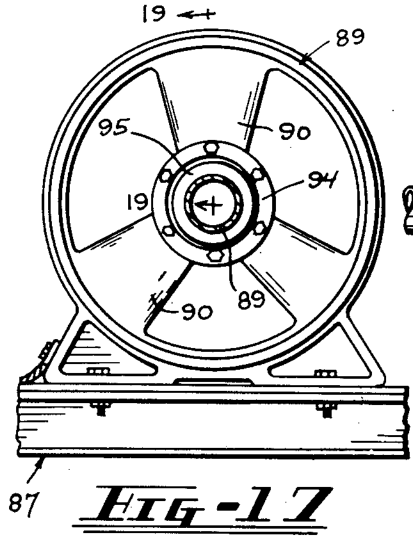
Figure 17 is an enlarged front view showing a modified form of the invention in which the bus bar is of a tubular formation.
Figure 18:
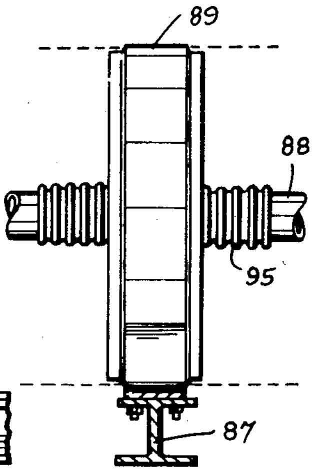
Figure 18 is a side view of Figure 17 in which a bus bar is supported by an insulator, which in turn, is suitably mounted in a support ring.
Figure 19:
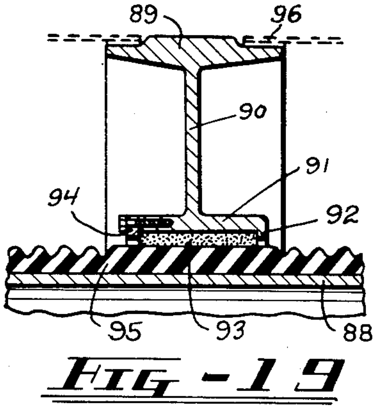
Figure 19 is an enlarged fragmentary sectional view through a portion of the modified form of the support ring as taken on the line 19—19 in Figure 17.

In a modification of the invention shown in Figures 17 to 19, inclusive, the structure 87 is similar to the foregoing with the exception that the bus bars 88 are tubular instead of being of a somewhat "cloverleaf" formation, and the general construction of the support rings 89 also differs from that of the support rings 32. In this respect, the support rings 89 have a plurality of webs 90 extending inward and a cylindrical formation 91 is supported on the center thereof. This cylindrical formation has a flange 92 extending inward around one edge thereof. A resilient ring 93 is fitted within the cylindrical formation 91 and a retaining ring 94 is secured on the opposite end of the cylindrical formation 91 thereby substantially securing the resilient ring within this cylindrical formation. An insulator 95 is supported by, and extends through the resilient ring 93 and the flange 92 and retaining ring 94 on the cylindrical formation extend downward only part way on this resilient ring thereby clearing the insulator 95 at all times. The tubular bus bar 88 extends through the insulator 95 and accordingly is supported thereby. The enclosure 96 is mounted on the support ring 89 in a similar manner to that of the aforesaid enclosures 31.

Figure 20:
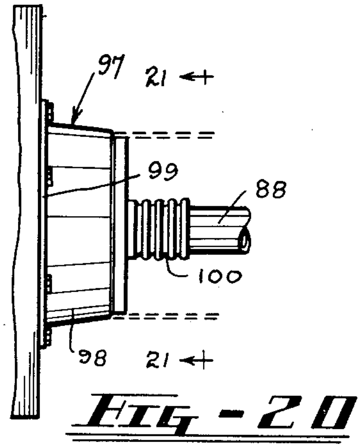
Figure 20 is a fragmentary side view showing a flanged ring support adapted to suitably mount the bus bar structure where the assembly passes through an obstruction.
Figure 21:
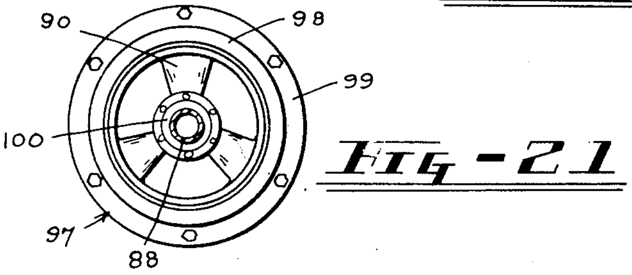
Figure 21 is a sectional view as taken on the line 21—21 in Figure 20.

A flange support ring 97 shown in Figures 20 and 21 is adapted for use with the modified form of the invention illustrated in Figures 17 to 19 inclusive, and is somewhat similar to the flange support ring 85 which is adapted to support the enclosure where a portion of the installation passes through an obstruction. In this instance, the body 98 of the flange support ring 97 extends outwardly from the flange 99 so as to permit a portion of the insulator 100 to be supported therein.

In the present invention the bus bars are shown as being supported at three points within each of the support rings and flange support rings, since this is the minimum number of support points which will rigidly maintain these bus bars in position in the manner hereinbefore set forth. However it will be realized that with slight alterations more or less support members could be used without changing the construction of the bus bars hereinbefore described.

What I claim is:

1. In isolated phase bus structures, a bus bar assembly comprising a plurality of bus bars, each of said bus bars being of a somewhat clover-leaf cross section and consisting of a plurality of projections extending outward from the center and extending continuously along the entire length thereof, each of said projections increasing in width as they extend outward from the center of said bus bars, the outer surface of each of said projections having an arcuately shaped groove extending along the entire length thereof, the extreme outer surface of each of said projections on said bus bars being of an arcuate shape and the center thereof being the center of said bus bars, and said bus bars having V-shaped grooves formed between said projections thereon, support rings, insulators mounted on said support rings and substantially supporting said bus bars, straight couplers providing a means of connecting said bus bars in alignment with one another, the end portion of each of said bus bars being turned downward before the assembly thereof to said straight couplers, said straight couplers being of a cylindrical formation on the outer surface thereof and having the inner wall of a shape and form coinciding with that of the ends of said bus bars, each of said straight couplers having rows of tapered holes equally spaced apart and extending thereinto, the outermost portion of each of the tapered holes in said straight couplers being enlarged and internally threaded at the outer ends thereof and having slits cut therein into and in alignment therewith, tapered plugs having an externally threaded portion on the outer end thereof, and said tapered plugs being inserted in the tapered holes in said straight couplers and being threaded thereinto, lubricating grease being applied to the ends of said bus bars and within said straight couplers before the same are engaged with one another, said tapered plugs then being tightened down in the tapered holes in said straight couplers and the slits in said straight couplers permitting the portions on each side thereof to be forced outward by said tapered plugs thereby substantially gripping the end portions of said bus bars, and enclosures secured to said support rings for isolating said bus bars and their couplers therein.

2. In isolated phase bus structures, a bus bar assembly comprising a plurality of bus bars, straight couplers, angle couplers, T-couplers, and flexible couplers providing connections between said bus bars, said flexible couplers being formed by the cutting of a straight coupler into a pair of couplers, each of said couplers forming a pair having rows of tapered holes equally spaced apart toward the ends thereof, the outermost portion of each of the tapered holes in said couplers being enlarged and internally threaded and having slits cut thereinto and in alignment therewith, each of the slits in said couplers being enlarged at the ends thereof, laminated strips extending into the enlarged slits in said couplers and being substantially adhered thereto, tapered plugs having an externally threaded portion on the outer end thereof, and said tapered plugs being inserted in the tapered holes in said couplers and being threaded thereinto, said tapered plugs then being tightened down in the tapered holes in said couplers and the slits in said couplers permitting the portions on each side thereof to be forced outward by said tapered plugs, thereby substantially gripping the end portions of said bus bars and accordingly forming a flexible connection therebetween, and enclosures secured to said support rings and forming a shield for said bus bars.

3. In isolated phase bus structures, a bus bar assembly comprising a plurality of bus bars, each of said bus bars being of a somewhat clover-leaf cross-section and consisting of a plurality of projections extending outward from the center and extending continuously along the entire length thereof, each of said projections increasing in width as they extend outward from the center of said bus bars, the outer surface of each of said projections having an arcuately shaped groove extending along the entire length thereof, the extreme outer surface of each of said projections on the bus bars being of an arcuate shape and the center thereof being the center of said bus bars, and said bus bars having V-shaped grooves formed between said projections thereon, support rings, straight couplers, angle couplers, and T-couplers providing a means of connecting said bus bars to one another, the end portion of each of said bus bars being turned down before the assembly thereof to said straight couplers, said angle couplers and said T-couplers, the inner walls of each of said straight couplers and said angle couplers and said T-couplers being suitably shaped to coincide with the formation of the end portions of said bus bars, each of said couplers having rows of tapered holes equally spaced apart and extending thereinto, the outermost portion of each of said tapered holes in said couplers being enlarged and internally threaded at the outer ends thereof and having slits cut thereinto and in alignment therewith, tapered plugs having an externally threaded portion on the outer end thereof and said tapered plugs being inserted in the tapered holes in said couplers and being threaded thereinto, said bus bars being engaged with said couplers and said tapered plugs then being tightened down in the tapered holes, said couplers and the slits in said couplers permitting the portions on each side thereof to be forced outward by said tapered plugs thereby substantially gripping the end portions of said bus bars, and enclosures secured to said support rings for isolating said bus bars and their couplers therein.

4. In isolated phase bus structures, a bus bar assembly comprising a plurality of bus bars, couplers suitably connecting said bus bars, a plurality of support rings suitably grounded, a group of three insulators mounted in each of said support rings for supporting said bus bars on three sides thereof, ball nose members mounted on the end of said insulators and adapted to engage said bus bars, and said bus bars being of a somewhat trefoiled cross section and the said ball nose members engaging in the three longitudinal recesses formed therein, enclosures comprising a stationary section and a movable section, a continuous hinge connecting said stationary section and said movable section of each of said enclosures, said continuous hinge consisting of a female hinge portion and a male hinge portion, said female hinge portion having an arcuate lip portion extending partially around a bead portion forming part of said male hinge portion thus providing a hinged connection therebetween, the inner adjacent portions of said female and said male hinge portions, forming a recess therebetween when the same are in a closed position, a gasket fixedly adhered within the recess portion in said female hinge portion, and a projection extending inward from said male hinge portion for engaging said gasket when said continuous hinge is brought to a closed position, and said female and said male hinge portions being substantially secured to said stationary and said movable sections, respectively, a stationary lock strip and a movable lock strip suitably secured to said stationary section and said movable section respectively, said stationary lock strip having lips formed on each side thereof, a second gasket fixedly adhered to said stationary lock strip, and said movable lock strip having a projection extending downward therefrom for engaging said second gasket when the aforesaid lock strips are brought together, a plurality of lips extending outward from the outer portion of said movable lock strip and coinciding in shape and being in direct alignment with said lip on the outer portion of said stationary lock strip, said plurality of lips on said movable lock strip being suitably spaced apart, a plurality of clamps engaging said lip on the outer portion of said stationary lock strip and adapted to be pivoted inwardly between said plurality of lips on said movable lock strip, and then said plurality of clamps being slid longitudinally over said plurality of lips on said movable lock strip thereby substantially securing the latter with said stationary lock strip, a pair of ring gaskets fitted over each of said support rings at each side of a central rib thereon and said stationary and said movable sections being fitted snugly against the ring gaskets, and said ring gaskets in co-operation with said gasket on said continuous hinge and said second gasket between said stationary and said movable lock strips effectively sealing said bus bars and their couplers within said enclosures.

5. In isolated phase bus structures, a bus bar assembly comprising a plurality of bus bars, couplers suitably connecting said bus bars, a plurality of support rings suitably grounded, a group of three insulators mounted in each of said support rings for supporting said bus bars on three sides thereof, ball nose members mounted on the ends of said insulators and adapted to engage said bus bars, and said bus bars being of a somewhat trefoiled cross section and said ball nose members engaging in the three longitudinal recesses formed therein, enclosures comprising a stationary section and a movable section, a continuous hinge connecting said stationary section and said movable section of each of said enclosures, a gasket suitably incorporated in said continuous hinge and adapted to form a seal when said stationary and said movable sections of each of said enclosures are in a closed position, a stationary lock strip and a movable lock strip suitably secured to said stationary section and said movable section respectively, said stationary lock strip having lips formed on each side thereof, a second gasket fixedly adhered to said stationary lock strip and said movable lock strip having a projection extending downward therefrom for engaging said second gasket when the aforesaid lock strips are brought together, a plurality of lips extending outward from the outer portion of said movable lock strip and coinciding in shape and being in direct alignment with said lip on the outer portion of said stationary lock strip, said plurality of lips on said movable lock strip being suitably spaced apart, a plurality of clamps engaging said lip on the outer portion of said stationary lock strip and adapted to be pivoted inwardly between said plurality of lips on said movable lock strip, and then said plurality of clamps being slid longitudinally over said plurality of lips on said movable lock strip thereby substantially securing the latter to said stationary lock strip, a pair of ring gaskets fitted over each of said support rings at each side of a central rib thereon, and said stationary and said movable sections being fitted snugly against said ring gaskets, angle enclosures and T-enclosures, stationary lock strips and movable lock strips located at each side of said angle and T-enclosures and being of a similar construction to that of the aforesaid stationary and movable lock strips securing said stationary and movable sections of each of said enclosures together, and said ring gaskets in co-operation with said gasket on said continuous hinge and said second gasket between said stationary and said movable lock strips on said enclosures effectively sealing said bus bars and their couplers within said enclosures.

JAMES WALTER STAFFORD.

REFERENCES CITED

The following references are of record in the file of this patent:

UNITED STATES PATENTS

| Number | Name | Date |
|---|---|---|
| 268,157 | Waring | Nov. 28, 1882 |
| 1,863,429 | Willmore | June 14, 1932 |
| 2,275,203 | Rudd | Mar. 3, 1942 |
| 2,293,310 | Rudd | Aug. 18, 1942 |
| 2,469,445 | Scott | May 10, 1949 |

FOREIGN PATENTS

| Number | Country | Date |
|---|---|---|
| 626,546 | Germany | Dec. 19, 1934 |